(12) United States Patent
Wilkens et al.

(10) Patent No.: US 7,152,729 B2
(45) Date of Patent: Dec. 26, 2006

(54) RECIPROCATING FLOOR CONVEYOR

(75) Inventors: Arthur L. Wilkens, Stockton, KS (US);
Michael A. Aldridge, Jr., Plainville, KS (US); Rodney D. Damrow, Woodston, KS (US)

(73) Assignee: Wilkens Manufacturing, Inc., Stockton, KS (US)

( * ) Notice: Subject to any disclaimer, the term of this patent is extended or adjusted under 35 U.S.C. 154(b) by 422 days.

(21) Appl. No.: 10/715,780

(22) Filed: Nov. 18, 2003

(65) Prior Publication Data

US 2005/0103600 A1 May 19, 2005

(51) Int. Cl.
*B65G 25/04* (2006.01)
(52) U.S. Cl. .................. 198/750.4; 198/750.3
(58) Field of Classification Search ........... 198/750.1, 198/750.2, 750.3, 750.4
See application file for complete search history.

(56) References Cited

U.S. PATENT DOCUMENTS

| | | |
|---|---|---|
| 5,165,524 A | 11/1992 | Foster |
| 5,234,309 A | 8/1993 | Foster |
| 5,301,798 A | 4/1994 | Wilkens |
| 5,355,994 A | 10/1994 | Foster |
| 5,445,260 A | 8/1995 | Foster |
| 5,482,155 A * | 1/1996 | Foster ............ 198/750.2 |
| 5,547,067 A | 8/1996 | Foster |
| 5,560,472 A | 10/1996 | Gist |
| 5,806,660 A | 9/1998 | Foster |
| 5,850,905 A | 12/1998 | Foster |
| 5,860,507 A | 1/1999 | Foster |
| 5,996,772 A | 12/1999 | Foster |
| 6,257,396 B1 * | 7/2001 | Quaeck ............. 198/750.3 |
| 6,585,106 B1 | 7/2003 | Foster |

OTHER PUBLICATIONS

KEITH Mfg. Co., Pressure Seal Slats.
HALCO Mfg. Co., Narrow Slat Leak Resistant Deck options.
HALCO Mfg. Co., Wide Slat Leak Resistant Deck options.
HALCO Mfg.,Co., Wide Slat Leak Resistant Deck options with plural guide beams.

* cited by examiner

*Primary Examiner*—James R. Bidwell
(74) *Attorney, Agent, or Firm*—Farris Law, P.C.; Robert L. Farris

(57) ABSTRACT

Reciprocating floor conveyor include floor slats and slide bearings. The floor slats include a top section, first and second side walls that extend downward from the top section, a first bottom flange integral with the first side wall and a second bottom flange integral with a second side wall. A top section cantilever portion extends laterally outward from the second side wall. A seal flange is integral with the first side wall and includes a seal support surface and a seal flange wall that cooperate with the first side wall to form a seal retainer channel position below the cantilever portion of an adjacent floor slat. The slide bearings have a cross beam, and right and left walls. Wings extend laterally outward from the top of the walls and sit on guide beams.

19 Claims, 6 Drawing Sheets

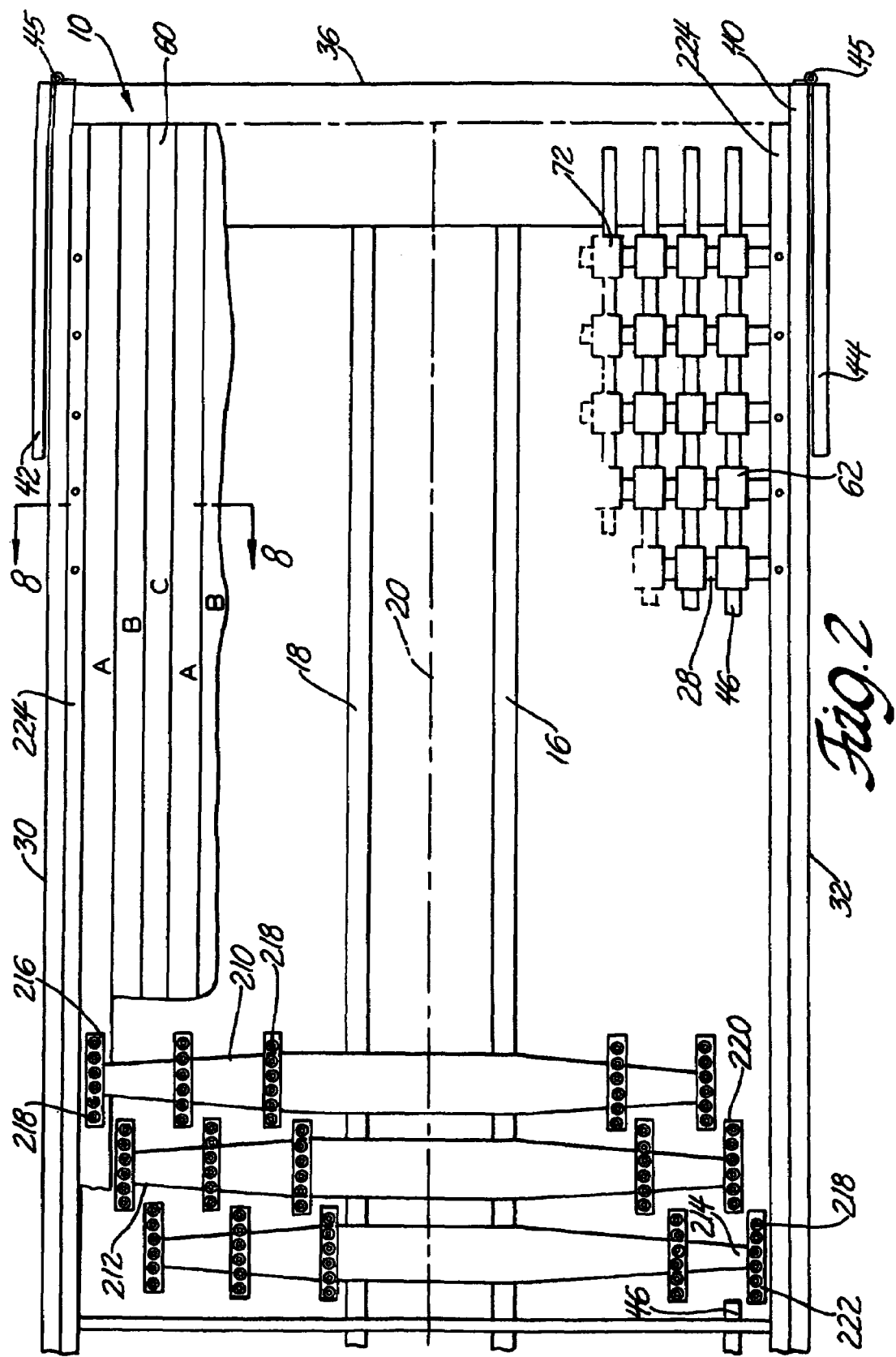

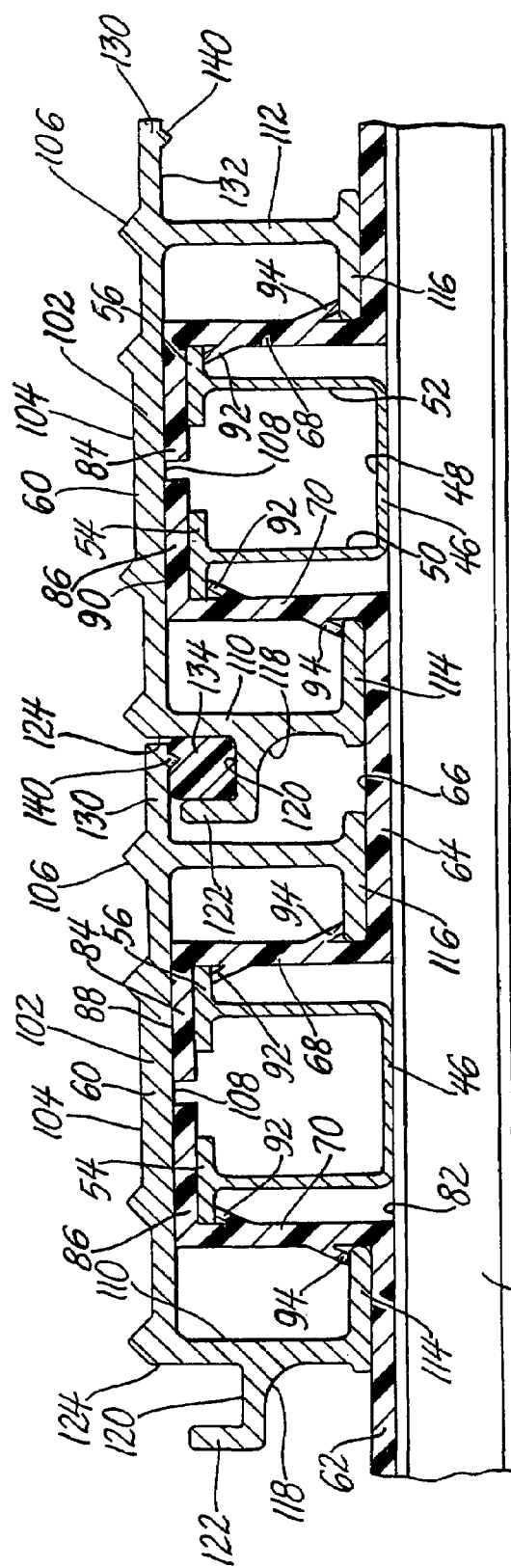
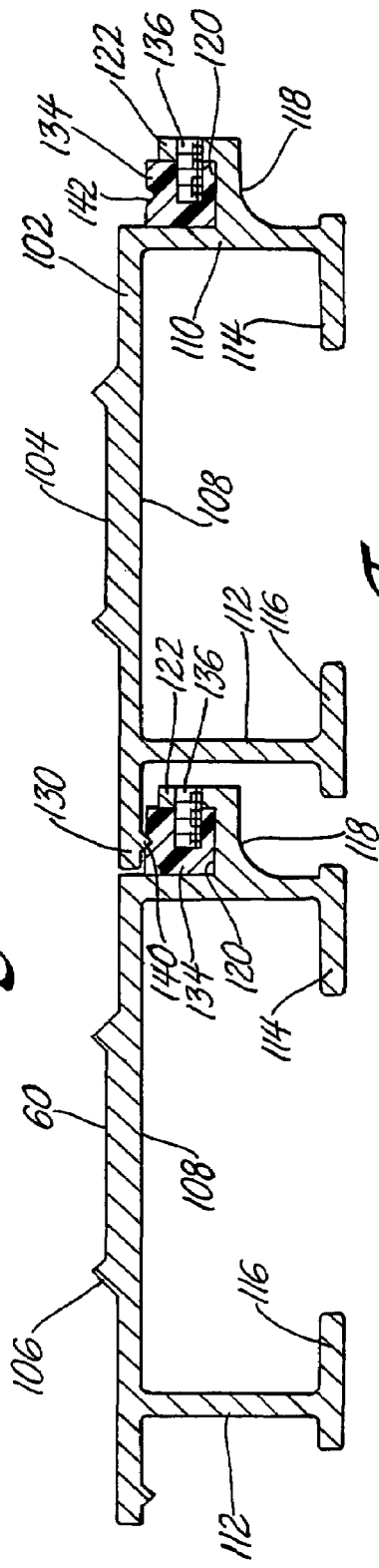
Fig.8
Fig.9

RECIPROCATING FLOOR CONVEYOR

TECHNICAL FIELD

This invention relates to reciprocating floor conveyors and more particularly to floor conveyors with seals between the floor slats and slide bearings.

BACKGROUND OF THE INVENTION

Reciprocating floor conveyors have been used for several years in van bodies and in trailers for unloading cargo. These conveyor systems are widely used for transporting bulk material such as ground plant material for animal feed, saw dust, wood chips, bark and plant material for human consumption. The conveyor systems include a plurality of parallel floor slats each of which extends substantially the length of the van body or trailer on which it is mounted. Each floor slat is supported by two slide bearings that permit it to slide back and forth in a direction parallel to its long axis.

Several different drives and drive systems have been employed in reciprocating floor conveyors to reciprocate the floor slats back and forth. A commonly used drive system includes three hydraulic cylinders that move all the slats simultaneously to the rear toward a rear discharge charge carrying cargo with them. The first cylinder is connected to and drives every third floor slat. The second cylinder is connected to and drives all the floor slats that are adjacent to a common side of the floor slats attached to the first cylinder. A third cylinder is connected to and drives the floor slats that are each between a floor slat driven by the first cylinder and a floor slat driven by the second cylinder. The first, second and third cylinders are activated one at a time to move every third floor slat forward and away from the rear discharge without moving cargo forward. The floor slats do not convey cargo when two thirds of the floor slats are stationary while one cylinder moves one third of the slats forward. The third cylinder moves the floor slats connected to it forward while the floor slats connected to the first and second cylinders remain stationary. The second cylinder then moves the floor slats connected to it forward while the floor slats connected to the first and third cylinders remain stationary. The first cylinder then moves the floor slats connected to the first cylinder forward while the floor slats connected to the second and third cylinders remain stationary. The above procedure is then repeated to move the cargo through the rear discharge opening. The procedure continues to be repeated until all the cargo is discharged.

Floor slats are commonly made form aluminum or other suitable material. Space is provided between aluminum floor slats to accommodate thermal expansion of the floor slats and to prevent galling. Galling can occur when aluminum floor slats are moving relative to each other and in contact with each other. The gaps between adjacent floor slats in reciprocating floor conveyors create two problems. One problem is the loss of cargo. This is not a serious problem if the cargo is non-toxic and inexpensive. Loss of cargo is a serious problem, however, if the cargo is a toxic material or if the cargo is expensive. The second problem is cargo contamination. Cargo can be contaminated by water and other material on a road surface that is thrown outwardly by vehicle wheels and passes through spaces between the floor slats. Cargo contamination is an extremely serious problem if the cargo is for human or animal consumption.

Two basic types of solutions to the problem caused by the space between floor slats have been tried. One solution is to place a fixed sub-floor under the floor slats to catch the material that passes between the floor slats and to prevent outside contaminates from contacting the floor slats. This solution adds weight and expense to reciprocating floor conveyor systems. Catching material that passes down between the slats also adds disposal problems if it is necessary to dispose of the material that is caught. Seals between the floor slats have been the preferred solution to the problem. Seals between the floor slats can virtually eliminate cargo loss as well as cargo contamination. Seals between reciprocating floor slats are generally resilient and rely upon their resilience to maintain sealing contact. Seals that can be inflated have also been tried. Inflated seals are deflated during conveying operations.

Some seals that are currently in use are carried by one floor slat and are in sliding contact with a vertical or near vertical surface on the side of the adjacent floor slat. These seals are made from the materials that have a low coefficient of friction, that are tough, and that are resilient. The low coefficient of friction is required to minimize the force required to reciprocate the floor slats back and forth and to prolong seal life. The seals must be made of tough material to prolong seal life and to prevent the penetration of cargo. Resiliency is required to accommodate variations and the size of the gap between floor slats and to maintain sealing contact between the seals and sliding contact surfaces on adjacent floor slats.

The floor slats slide fore and aft on bearings that support and guide each floor slat. These bearings allow limited lateral movement of the floor slat. Cargo may therefore move the floor slats laterally. If the reciprocating floor is slightly lower on one side than on the other side, the cargo will tend to move the floor slats toward the low side. This results in a decrease in a gap between some floor slats and an increase in the gap between other floor slats. The seals that slide on a vertical or near vertical surface must have the ability to accommodate the changes in the gap between adjacent floor slats. Seals that have been used in the past can accommodate only small changes in the size of the gap between adjacent floor slats.

Some seals that are currently in use are compressed when the gap between adjacent floor slats decrease. With a few seal designs a portion of the seal can become pinched between the surfaces on adjacent floor slats. This pinching increases the load between the seals and the floor slat surface. The increased load due to seal compression or due to pinching the seal increases the power required to reciprocate the floor slats and increases wear.

Cold temperatures tend to stiffen resilient seals. It has been found that some seals that are stiffened by low temperature can wear through the side of a floor slat thereby destroying the floor slat in a relatively short period of time.

Abrasive cargo increases the wear between floor slats and seals that are in sliding contact with each other. Some parts of floor slats cannot accommodate much wear without the floor slat being essentially destroyed.

Some floor slat seal designs, that are currently in use, create a pocket which catches and retains solids and liquids that pass through the space between the upper portions of adjacent floor slats. In cold weather the liquid and solids freeze. The frozen liquids and solids may exert large forces on seals due to the expansion of the liquid as it turns to ice. The excess force on the seals increases the force required to reciprocate the floor slats and increases wear on the seals and seal contact surfaces. The solids held by the frozen liquids also increase wear on the floor slats and the seals if the solids are abrasive.

SUMMARY OF THE INVENTION

Each floor slat, of a plurality of side by side parallel floor slats for a reciprocating floor conveyor, has a front end, a rear end, and a top section. The top section includes a generally horizontal top surface, a first side and a second side. A first side wall integral with the first side of the top section, extends downward from the top section, and extends from the front end to the rear end of the floor slat. A second side wall, integral with the top section, parallel to and spaced from the first side wall, extends downward from the top section, and extends from the front end to the rear end of the floor slat. A first bottom flange integral with the first side wall, extends laterally toward the second side wall, extends from the front end to the rear end, and is vertically spaced from the top section. A second bottom flange is integral with second side wall, extends laterally inward toward the first side wall, extends from the front end to the rear end, and is vertically spaced from the top section. A top section cantilevered portion is integral with the top section, extends laterally outward from the second side wall and extends from the front end to the rear end.

A seal flange integral with the first side wall includes a flat horizontal seal support surface. A vertical wall, integral with a seal flange, cooperates with an outboard side of the first side wall to form a seal retainer channel that is outboard of the outboard side of the first side wall. The seal retainer channel has an open channel top and extends from the front end and to the rear end of the floor slat. The top section cantilevered portion of each floor slat is vertically spaced above an adjacent floor slat seal retainer channel.

A combination seal and bearing is mounted in the seal retainer channel. An upwardly facing bearing surface of the combination seal and bearing is engagable with a seal contact surface on a cantilevered portion bottom.

A reciprocating floor conveyor slide bearing includes a horizontal center base with a base front end, a base rear end, a base left side, a base right side, a cross beam engaging bottom surface, a first floor slat top bearing surface, and a second floor slat top bearing surface. A left side wall is integral with the base left side and extends upward from the horizontal base and from the base front end to the base rear end. A right side wall is integral with a base right side and extends upwardly from the horizontal base and from the base front end to the base rear end. A left wing is integral with a left side top of the left side wall and extends to the left of the left side wall. The left wing has a guid beam engaging left wing bottom surface and left wing top bearing surface. A right wing is integral with a right side top of the right side wall and extends to the right of the right side wall. The right wing has a guide beam engaging right wing bottom surface and right wing top bearing surface. A front vertical transverse wall extends downward from the horizontal central base adjacent to the cross beam engaging bottom surface. A rear vertical transverse wall extends downward from the horizontal central base adjacent to the cross beam engaging bottom surface. The front vertical transverse wall, the rear vertical transverse wall, and the cross beam engaging bottom surface form a transverse cross beam receiving channel.

The slide bearing are an extruded or a molded one piece structure. An ultra high molecular weight plastic material is preferred for extruding or molding the slide bearings.

BRIEF DESCRIPTION OF THE DRAWINGS

Reference now is made to the accompanying drawings in which:

FIG. 2 is an enlarged top plan view of a portion of the reciprocating floor conveyor and semi trailer with some parts removed and other parts broken away to show the construction;

FIG. 8 is an enlarged sectional view taken along line 8—8 in FIG. 2; and

FIG. 9 is a sectional view of two floor slats and floor seals looking in the opposite direction from the section as shown in FIG. 8.

DESCRIPTION OF THE PREFERRED EMBODIMENT

Figure 1:
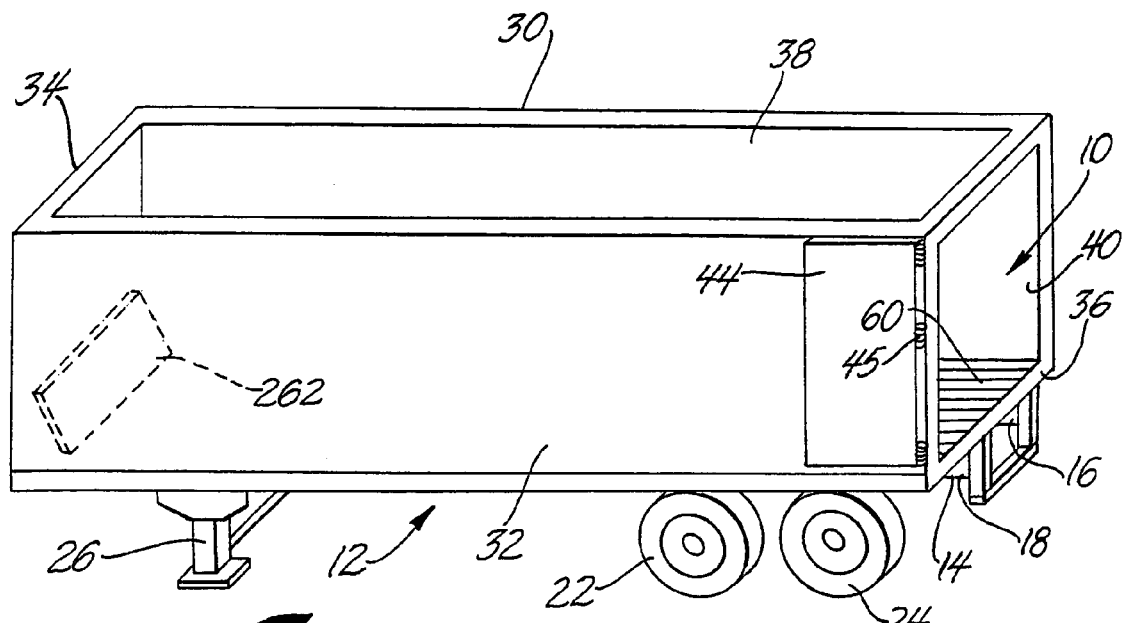
FIG. 1 is a perspective view of a semi trailer employing a reciprocating floor conveyor for unloading cargo.

The reciprocating floor conveyor 10 is shown in the drawing as part of a semi trailer 12. The reciprocating floor conveyor 10 could also be part of a van body mounted on a truck chassis. The floor conveyor 10 may also be part of a stationary conveying system. The semi trailer 12 as shown in FIG. 1 has a main frame 14 which includes a pair of spaced apart channel members 16 and 18 that are parallel to a center axis 20 running the length of the semi trailer. The rear portion of the semi trailer 12 is supported by wheels and tires 22 and 24 that are rotatably journaled on conventional axles. The axles are attached to the main frame 14 by a suspension system. A portion of the semi trailer 12 is supported by a vertically adjustable landing gear 26. A hitch pin (not shown) for attaching the semi trailer 12 to a fifth wheel on a tractor is attached to the bottom by the main frame 14 on the center line 20 of the semi trailer 12 forward of the landing gear 26. Channel members 16 and 18 end at a point to the rear of the hitch pin and are indirectly attached to the hitch pin to keep the height of the reciprocating floor 10 at the front of the semi trailer 12 at the same height as the reciprocating floor conveyor at the rear of the semi trailer.

A plurality of cross beams 28, that are transverse to the center line 20, are attached to the main frame 14. The cross beams 28, as shown, are I-beams. These cross beams 28 can be aluminum or steel. The spacing of a cross beam 28 depends on the intended use and the cargo the reciprocating floor conveyor 10 supports. The cross beams 28 have been placed on 12 inch centers in some semi trailers 12. In other semi trailers 12 the center lines of the cross beams 28 have been as much as fifteen inches apart.

The right side wall 30 is attached to the right hand ends of the cross beams 28. A left side wall 32 is attached to the left hand ends of the cross beams 28. A front end wall 34 is attached to the right side wall 30 and the left side wall 32 and to the front portion of the main frame 14. The top and bottom of the right side wall 30, the left side wall 32 and the front end wall 34 are reinforced to provide structural integrity. A pair of cross beam 36 and 37 are connected to the right side wall 30 and the left side wall 32 at the rear of the semi trailer 12 to reinforce the cargo container 38 and to define a rear discharge opening 40 that is substantially the same height and width as the cargo container 38. Doors 42 and 44 for closing the discharge opening 40 are attached to the right side wall 30 and the left side wall 32 by hinges 45. The top of the semi trailer 12 is open for depositing cargo in the cargo container 38.

A plurality of guide beams 46, that are parallel to the center line 20, are attached to the tops of the cross beams 28. The attachment of the guide beams 46 to the cross beams 28 may be by mechanical fasteners or by welding. The guide beams 46 are a U-shaped channel that extends substantially the entire length of the semi trailer 12. These U-shaped channels 46 have a horizontal base 48 and vertical sides 50 and 52. A horizontal top support plate 54 is integral with top of the vertical side 50. A horizontal top support plate 56 is integral with the top of the vertical side 52. The guide beams 46 have an end that is adjacent to the front end wall 34 and an end that is adjacent to the doors 42 and 44 when the doors are closing the rear discharge opening 40. There is a section removed from each guide beam 46 in the center portion of the semi trailer 12 to provide space for the floor slat drive assembly 58. The guide beams 46 are on centers that are spaced apart a distance that is slightly more than the width of the floor slats 60. If the width of the floor slats 60 is 3.610 inches, center lines of the guide beams 46 may for example, be 3.650 inches apart. This provides a nominal gap of four hundredths of an inch which is generally satisfactorily when using floor slats made from aluminum. If the floor slats 60 are made from material such as resins that can function as low friction bearing surfaces, it may not be necessary to provide a nominal gap between adjacent floor slats to prevent sliding contact between adjacent floor slats. However, it may be necessary to provide for thermal expansion. The number of guide beams 46 required depends on the inside width of the cargo container 38 and the width of the floor slats 60. In some reciprocating floor conveyors ten to twenty-four or more guide beams 46 are required. Reciprocating floor conveyors 10 with wide floor slats 60 have been used which employ two space guide beams 46 for each floor slat.

Figure 7:
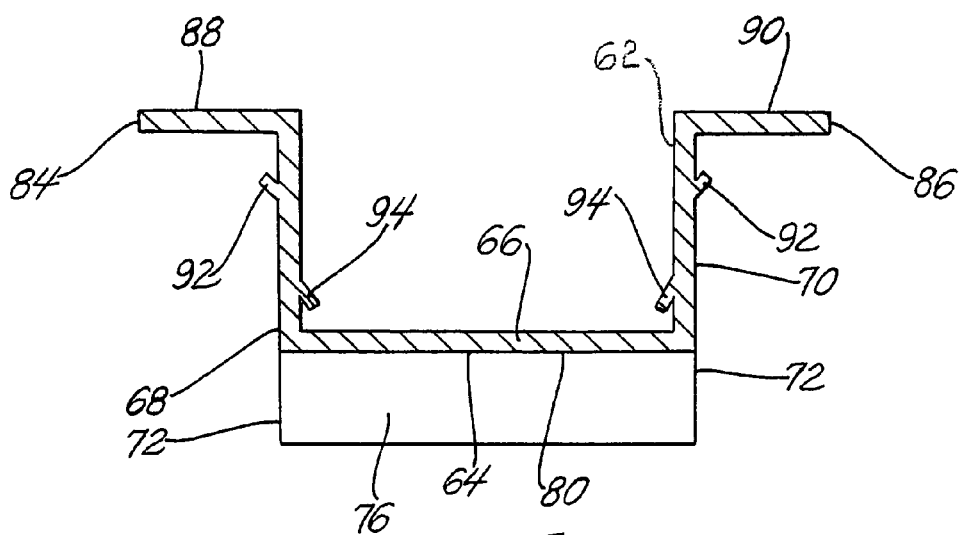
FIG. 7 is a sectional view of a slide bearing taken along line 7—7 in FIG. 6.

The slide bearings 62 are shown in FIGS. 5, 6, 7, and 8. The slide bearings 62 are made from an from an ultra high molecular weight (UHMW) plastic that has a low coefficient of friction, high wear resistance and high strength. Each slide bearing 62 has a base 64 with a flat bearing surface 66. Spaced apart vertical side plates 68 and 70 extend upwardly from the base 64. The side plates 68 and 70 also include triangular portions 72 and 74 that extend downwardly from the base 64. A vertical transverse wall 76 extends from triangular potions 72 of side plate 68 to the triangular portion 72 of the side plate 70 and downward from the base 64. A vertical transverse wall 78 also extends between the triangular portions 74 of the side plates 68 and 70 and downward from the base 64. The base 64 and the walls 76 and 78 form a channel 80 that receive a top flange 82 of a cross beam 28. The base 64 of each slide bearing 62 sits on the upper surface of the flange 82. The vertical transverse walls 76 and 78 contact front and rear edges of the cross beam 28 and prevent movement of slide bearings 62 parallel to the guide beams 46. Wing members 84 and 86 of the slide bearings 62 are integral with the upper edges of the side plates 68 and 70 and extend laterally outward from the side plates. Each wing member 84 and 86 has a bearing surface 88 or 90. Upper fingers 92 shown in FIG. 7, are provided on the upper outside surface of both plates 68 and 70. Lower fingers 94 are provided on the lower inside surface of both side plates 68 and 70. The upper fingers and the lower fingers extend the length of the side plates 68 and 70.

Figure 4:
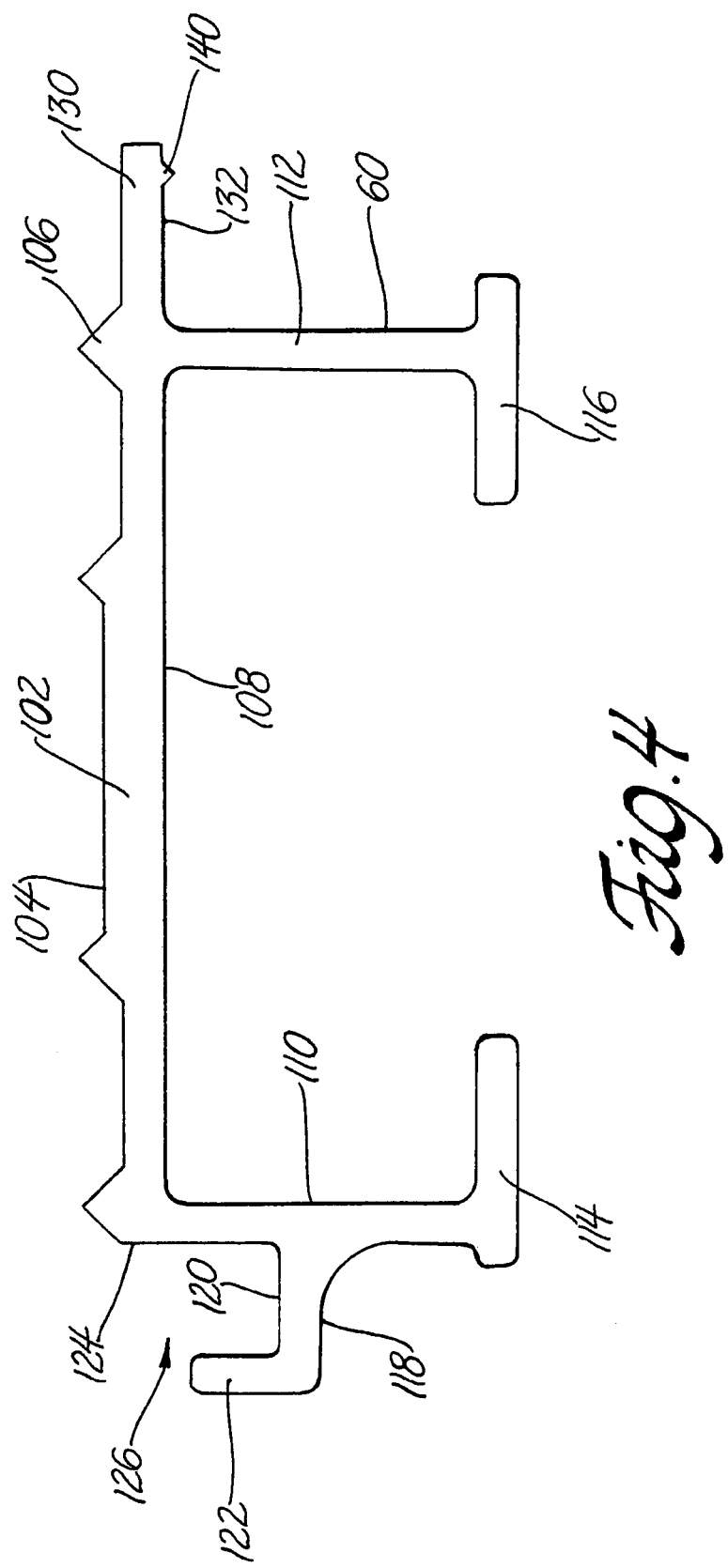
FIG. 4 is an enlarged end view of the floor slat.
Figure 5:
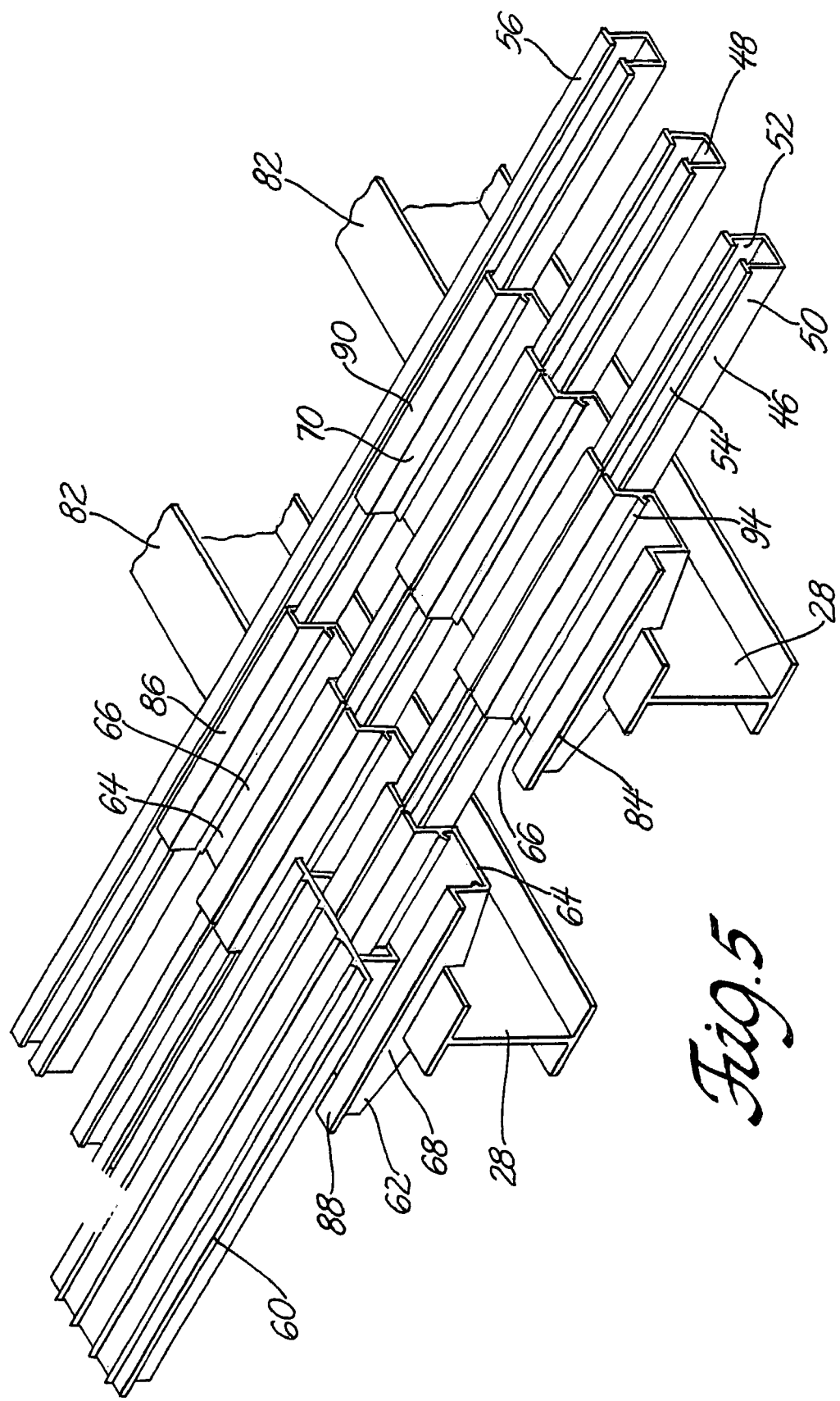
FIG. 5 is an enlarged perspective view of a portion of the floor with parts broken away.
Figure 6:
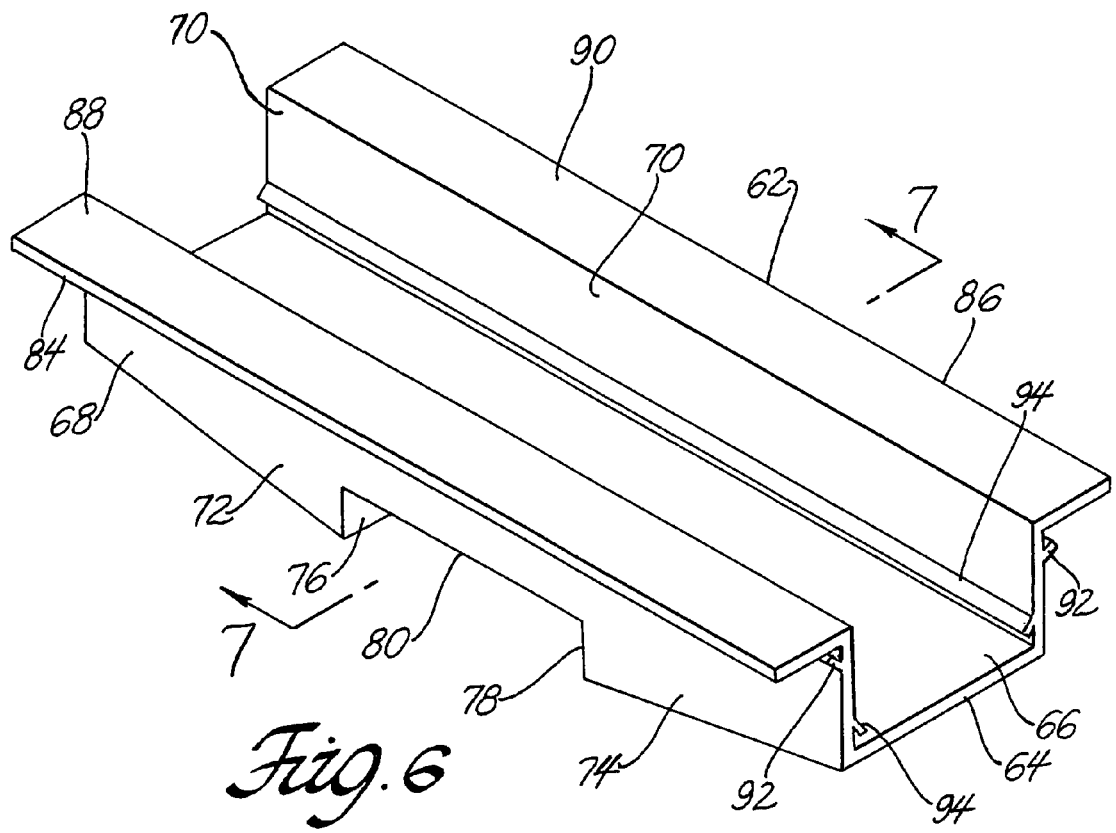
FIG. 6 is an enlarged perspective view of a slide bearing.

During installation of the slide bearings 62, each bearing is forced down between two guide beams 46. The channel 80 receives one of the cross beams 28 to fix the position of each slide bearing 62 along the length of the guide beams 46. The upper fingers 92 snap into position under the outer edge of the top support plates 54 and 56 of two adjacent guide beams 46 to lock each slide bearing in place and hold the base 64 in position adjacent to the top of flange 82 of a cross beam 28. The base 64 is preferably held in an engagement with the cross beam 28. The floor slats 60, as shown in FIGS. 4, 5, and 8 can be made from metals or from resins. Aluminum floor slats 60 are employed in many floor conveyors 10. Resins are used to make floor slats for conveying caustic materials as well as other materials. Floor slats made from resins can be reinforced by fibers such as glass, carbon and fiber cloth layers of unidirectional fiber net material sold under the trademark KELVAR® owned by New England Ropes, Inc. Resins floor slats may be formed by extrusion processes. If a resin with fiber reinforcement is used, a modified extrusion process referred to as pultrusion is used to move the fibers and resin through a forming dye. Aluminum floor slats 60 are generally made by an extrusion process. Floor slats 60 can also be formed by casting and other manufacturing processes.

Each floor slat 60 includes a top section 102 with a generally horizontal top surface 104. Ribs 106 can be added to the top surface 104 to strengthen the floor slat 60 if desired. The thickness of top section 102 can be increased in some areas to increase floor slat strength. A bottom surface 108 of the top section 102 is a slide bearing contact surface. A generally vertical first wall 110 extends downward from a first side of a top section 102. The first side wall 110 also extends substantially the length of the top section 102 in most reciprocating floor conveyors 10. A generally vertically second side wall 112 extends downward from the second side of the top section 102. The second side wall 112 also extends substantially the length of the top section 102. The top section 102 and the first and second side wall 110 and 112 form a channel shape member.

A first bottom flange 114 of a floor slat 60 is integral with the bottom of the first side wall 110 and extends horizontally inward toward the second side wall 112. A second bottom flange 116 is integral with the second side wall 112 and extends horizontally inward toward the first side wall 110.

A seal flange 118 is integral with the first side wall 110, extends laterally outward from the side wall, and has a generally horizontal seal support surface 120 that faces upwardly and is spaced below the top section 102. The first seal flange 118 also has a generally vertical wall 122 that extends upward from a support surface 120 and is spaced from an outboard side 124 of the first side wall 110. The seal flange 118 also extends substantially the length of the first side wall 110. The outboard side 124 of the side wall 110, the horizontal seal support surface 120 and the vertical wall 122 form a seal retainer channel 126 with an open top.

The top section 102 of the floor slat 60 includes a top section cantilevered portions 130 that extends laterally outward past the second side wall 112 and has a downwardly facing generally horizontal seal contact surface 132. This portion 130 of the top section 102, with a second seal contact surface 132 supports cargo. The cargo supported by this portion 130 exerts some force on the second side of the floor slat 60 that tends to rotate the slat about the slat long axis. When two floor slats 60 are mounted in a floor conveyor 10 adjacent to each other, the first seal supports surface 120 is directly below the second seal contact surface 132 and is spaced from second seal contact surface. A combination seal and bearing 134 has a rectangular cross section and extends substantially the entire length of the floor slats 60. The seal retainer channel 126 receives the combination seal and bearing 134. A snug fit between the seal and bearing 134 and the channel 126 limits movement of the seal relative to the channel. The seal 134 is preferably made from an ultra high molecular weight (UHMW) plastic or similar material. This plastic material is flexible, tough and has a low coefficient of friction. UHMW plastic expands when the temperature increases and contracts when the temperature decreases. To accommodate length changes in the seal 134, the seal must be free to float in the channel 126 in a direction parallel to the long axis of the floor slats 60. Seal contraction and expansion is accommodated by an anchor 136. The anchor 136 can be a threaded member that screws into a threaded bolt passage through the vertical wall 122 and extends into the seal 134 in one location between the ends of the seal. The anchor 136 fixes the seal 134 in one place relative to the channel 126 and leaves the ends of the seal to move toward or away from the anchor due to temperature changes. Seal expansion can also be accommodated by end stops at both ends if the highest temperature of the seal 134 is known. When the highest temperature is known, the seal 134 can be cut with a selected length that does not exceed the distance between the end stops at maximum seal temperature. The threaded anchor 136 can be replaced by a non-threaded fastener.

A downward extending V-shaped projection 140 from the second seal contact surface 132 on the cantilevered portion 130 of a floor slat 60 contacts the seal 134 and forms a groove 142 in an upper surface of the seal. This projection 140, extending the length of the floor slat 60, cooperates with the groove 142 formed in the seal 134 to form a seal that limits loss of cargo and reduces contamination. The groove 142 is formed in the seal 134 by the operation of the floor slat 10 when supporting cargo.

Cargo on the floor slat 60 rest on the top surface 104 of the top section 102. A portion of the load on the top surface 104 is transferred through bottom surface 108 of the top section 102, to bearing surfaces 88 and 90 on two adjacent slide bearings 62, to top support plates 54 and 56 on the guide beam 46 and to cross beams 28. The top support plates 54 and 56 are wider than the base 48 of the guide beams 46 and resists any rotation of the floor slats 60 about the long axis of the supported floor slats 60.

A portion of the load on the top surface 104 of a top section 102 of a floor slat 60 is transmitted through the side walls 110 and 112 to the bottom flanges 114 and 116 and through the base 64 of two slide bearings 62 to a cross beam 28. The side flanges 114 and 116 are spaced apart to further resist rotation of a floor slat 60 about a floor slat long axis.

A portion of the load on the top surface 104 of a floor slat 60 is supported by the cantilevered portion 130 of the top section 102. The load on the cantilevered portion 130 is transferred through the seal and bearing 134 to the seal support surface 120 in the seal retainer channel 126 on an adjacent floor slat 60. The load on the adjacent floor slat 60 is transferred to the first bottom flange 114 through the base 64 of a slide bearing 62 and to a cross beam 28. The seal 134 is a load support member and functions as a bearing to permit sliding of one floor slat 60 relative to an adjacent floor slat. The seal 134 is a combination bearing and seal as explained above. Each floor slat 60 is slideably supported at five separate areas across the width of the slat. The width of support plates 54 and 56 and bottom flanges 114 and 116 are nearly 80% of the width of the floor slats 60. With a large support area and larger bearing surfaces, the load per unit area is decreased. Decreasing the load per unit area decreases wear and extends the life of the floor conveyor 10.

The support is provided by the slide bearing 62 and each cross beam 28 along the length of each floor slat 60. Cargo placed on the floor conveyor 10 increases the resistance to leakage. This increased load on the seal 134 also increases the force required to reciprocate the floor slat 60 due to the floor seal 134. The increase in the force required to reciprocate the floor slat 60 is minimal however, due to the low coefficient of friction of the material employed to make the floor seal 134.

The floor slats 60 are slightly shorter than the semi trailer 12 or other cargo container 38 to prevent damage to floor slats if they are reciprocated back and forth while the discharge opening 40 is closed. The forward ends of the floor slats 60 are under a slant board 262 while conveying cargo. The slant board 262 prevents cargo from entering the space between the forward ends of the floor slats 60 and the front end wall 34. The floor slats 60 in some semi trailers 12 can be over fifty feet long. These floor slats 60 preferably have the same cross sectional shape over their entire length.

During construction of the floor conveyor 10, a plurality of guide beams 46 are secured to the cross beams 28. Mechanical fasteners are generally used to facilitate replacement of damaged guide beams 46. The guide beams 46 extend the length of the cargo container 38 except for the area where the floor slats 60 are attached to drive beams 210, 212 and 214 of a floor slat drive assembly 58.

Slide bearing 62 are attached to the guide beams 46 in each location where a guide beam crosses a cross beam 28. Upper fingers 92 on the slide bearing 62 snap into position underneath the top support plates 54 and 56 to hold the slide bearings in place. Mechanical fasteners are not required. Floor slats 60 are then placed over each guide beam 46 and straddle adjacent sides of two slide bearings 62 at each cross beam 28. A vertical downward force on each floor slat 60 forces the bottom flanges 114 and 116 to snap into position under the lower fingers 94. Half floor slats 224 are fixed to the ends of the cross beams 28 adjacent to the side walls 30 and 32.

A number of floor slats 60 with designs that are somewhat different than the floor slats described above can be used with the slide bearings 62. The floor slats 60 described above can also be used with slide bearings that are somewhat different than the slide bearings 62.

The floor slat drive assembly 58 includes transverse drive beams 210, 212 and 214. The transverse drive beam 210 has a plurality of spaced apart floor slat connectors 216 that are connected to each A floor slat 60 by bolts 218. The transverse drive beam 212 has a plurality of spaced apart floor slat connectors 220 which are connected to each B floor slat 60 by bolts 218. The B floor slats 60, as shown in FIG. 2, are on the left hand side of each A floor slat as seen when looking toward the front end wall 34 from the discharge opening 40. The transverse beam 214 has a plurality of spaced apart floor slat connectors 222 which are connected to each C floor slat 60 by bolts 218. The C floor slats 60 are positioned between each A floor slat and B floor slat. At the right and left edges of the reciprocating floor conveyor 10 adjacent to the right side of the wall 30 and the left side wall 32 is a non-reciprocating half floor slat 224. The half floor slat 224 has been cut through the horizontal top section 102 along its entire length. The left half of the half floor slat 224 is bolted to cross beams 28 adjacent to the right side wall 30 with an integral left side wall 110 to the left. The right half floor slat 224 is bolted to the cross beams 28 adjacent to the left side wall 32 with its integral side wall 112 to the right. The two half slats 224 can be adjusted horizontally toward and away from the centerline 20 of the trailer 12 to set the gap between the adjacent floor slats 60. The horizontal adjustment of the half floor slats 224 toward and away from the centerline 20 can be made at the time of assembly and slots can be provided for the bolts that secure the half floor slats to the cross beams 28 to facilitate field adjustment. The floor slats 60 can float laterally within limits on the slide bearings 62 toward and away from the centerline 20.

Figure 3:
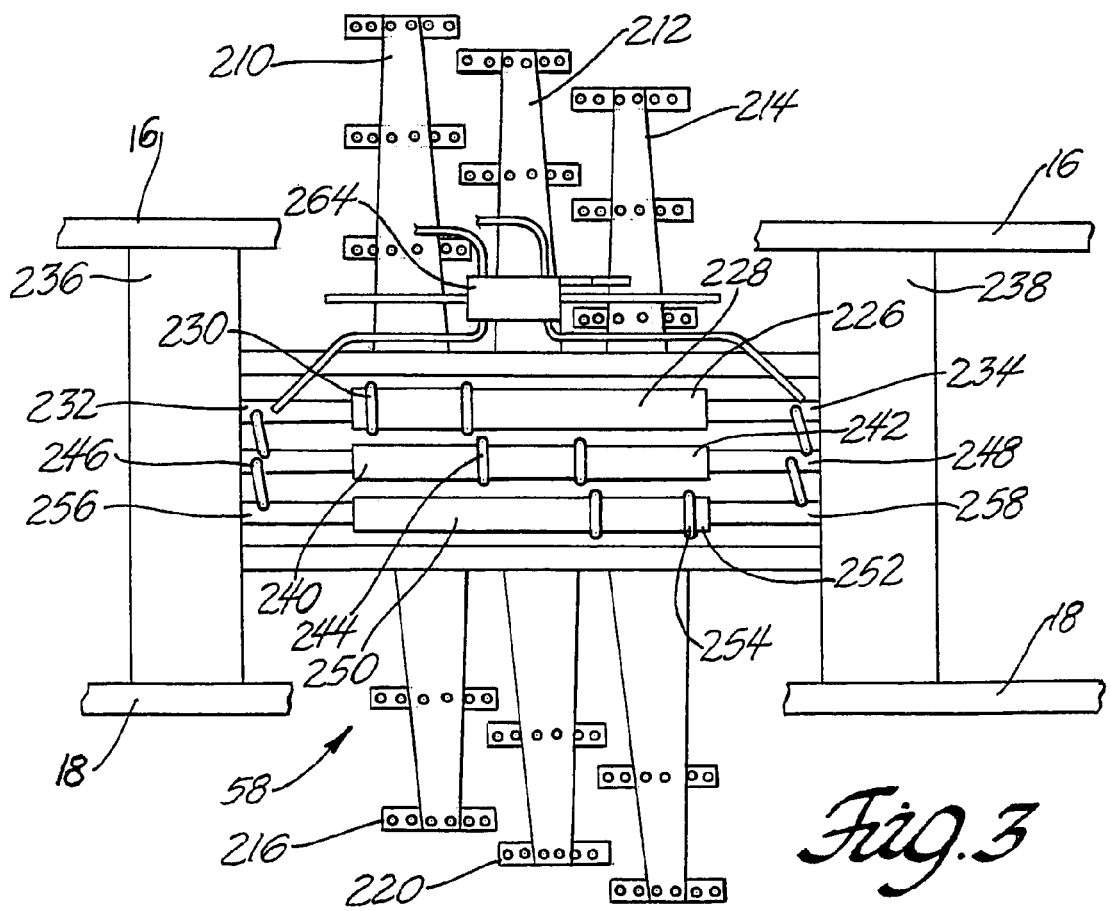
FIG. 3 is a bottom plan view of the floor slat drive assembly with parts broken away.

The transverse drive beam 210, as shown in FIG. 3, is clamped to the cylindrical barrel 226 of hydraulic cylinder 228 by U-clamps 230. The hydraulic cylinder 228 has two piston rods 232 and 234 which are fixed to cross beams 236 and 238 that are secured to the spaced apart channel members 16 and 18 forward of the wheels and tires 22 and 24 and to the rear of the landing gear 26 and the hitch pin for attaching the semi trailer 12 to a fifth wheel. Hydraulic fluid under pressure is applied to the hydraulic cylinder assemblies 228 to move the A floor slats 60 back and forth. The transverse drive beam 212 is clamped to the cylindrical barrel 240 of the hydraulic cylinder assembly 242 by U-clamps 244. The hydraulic cylinder assembly 242 has two piston rods 246 and 248 which are fixed to cross beams 236 and 238. Hydraulic fluid under pressure applied to the hydraulic cylinder assembly 42 to move the B floor slats 60 back and forth. The transverse drive beam 214 is clamped to the cylindrical barrel 250 of a hydraulic cylinder assembly 252 by U-clamps 254. Hydraulic cylinder assembly 252 has two piston rods 256 and 258 which are fixed to cross beams 236 and 238. Hydraulic fluid under pressure is supplied to the hydraulic cylinder assembly 252 to move the C floor slats 60 back and forth.

A hydraulic pump (not shown) supplies hydraulic fluid under pressure to the hydraulic cylinders 228, 242 and 252. The flow of hydraulic fluid under pressure from the pump to the cylinders is controlled by control valves (not shown) and a switching valve 264. Valves and control systems for controlling the flow of hydraulic fluid and reciprocating the force slat 60 back and forth are well known.

The disclosed embodiment is representative of a presently preferred form of the invention, but is intended to be illustrative rather than definitive thereof. The invention is defined in the claims.

We claim:

1. A reciprocating floor conveyor comprising a plurality of side by side parallel floor slats each of which includes a front end, a rear end, a top section with a generally horizontal top surface, a first side, and a second side;

a first side wall, of each floor slat, integral with the first side of the top section, extending downward from the top section and extending from the front end to the rear end;

a second side wall, of each floor slat, integral with the second side of the top section, extending downward from the top section, parallel to and spaced from the first side wall;

a first bottom flange integral with the first side wall, of each floor slat, extending laterally inward toward the second side wall, extending from the front end to the rear end, and vertically spaced from the top section;

a second bottom flange integral with the second side wall, of each floor slat, extending laterally inward toward the first side wall, extending from the front end to the rear end, and vertically spaced from the top section;

a top section cantilevered portion integral with the top section, of each floor slat, extending laterally outward from the second side wall, and extending from the front end to the rear end;

a seal flange integral with the first side wall, of each floor slat, including a seal support with a seal support surface, a vertical wall integral with the seal support flange that cooperates with an outboard side of the first side wall to form a seal retainer channel that is outboard of the outboard side of the first side wall, has an open channel top and extends from the front end to the rear end;

wherein the top section cantilevered portion of each floor slat is vertically spaced above an adjacent floor slat seal retainer channel; and wherein the top section of each floor slat includes a downwardly facing bearing contact surface between the first side wall and the second side wall.

2. A reciprocating floor conveyor, as set forth in claim 1, wherein the first side wall is vertical and the second side wall is vertical.

3. A reciprocating floor conveyor, as set forth in claim 1, including a combination seal and bearing mounted in the seal retainer channel and having an upwardly facing bearing surface engagable with a seal contact surface on an adjacent floor slat cantilevered portion bottom.

4. A reciprocating floor conveyor, as set forth in claim 3, including a projection extending downward from the seal contact surface and from the front end to the rear end and wherein the projection forms a groove in the upwardly facing bearing surface.

5. A reciprocating floor conveyor, as set forth in claim 4, wherein the projection is received in the groove in the combination seal and bearing to create a seal.

6. A reciprocating floor conveyor, as set forth in claim 3, wherein the combination seal and bearing is an ultra-high molecular weight plastic.

7. A reciprocating floor conveyor, as set forth in claim 6, including an anchor that limits movement between the combination seal and bearing and the seal retainer channel.

8. A reciprocating floor conveyor, as set forth in claim 1, wherein the top section includes a first bottom surface between the first side wall and the second side wall that is a central bearing sliding contact surface, a first bottom flange bottom surface that is a first bearing sliding contact surface, a second bottom flange bottom surface that is a second bearing sliding contact surface, and a top section cantilevered portion downwardly facing surface that is a combination seal and bearing sliding contact surface.

9. A reciprocating floor conveyor, as set forth in claim 1, including a plurality of slide bearings each of which has a transverse channel that receives a cross beam, a fore and aft channel with a base that sits on the cross beam between a pair of adjacent guide beams, a right vertical wall and a left vertical wall extending upward from the base, a left wing that extends laterally outward from the left vertical wall and sits on a first guide beam, a right wing that extends laterally outward from the right vertical wall and sits on a second guide beam, and wherein the each of the plurality of side by side parallel floor slats receives the right wing of one of the plurality of slide bearings and the left wing of an adjacent one of the plurality of slide bearings between the first side wall and the second side wall of one of the plurality of side by side parallel floor slats.

10. A reciprocating floor conveyor slide bearing comprising:

a horizontal central base including a base front end, a base rear end, a base left side, a base right side, a cross beam engaging bottom surface, a first floor slat top bearing surface, and a second floor slat top bearing surface;

a left side wall integral with the base left side and extending upward from the horizontal base and from the base front end to the base rear end;

a right side wall integral with the base right side and extending upward from the horizontal base and from the base front end to the base rear end;

a left wing integral with a left side top of the left side wall, extending to the left of the left side wall, having a guide beam engaging left wing bottom surface and a left wing top bearing surface;

a right wing integral with a right side top of the right side wall, extending to the right of the right side wall, having a guide beam engaging right wing bottom surface and a right wing top bearing surface;

a front vertical transverse wall extending downward from the horizontal central base adjacent to the cross beam engaging bottom surface;

a rear vertical transverse wall extending downward from the horizontal central base adjacent to the cross beam engaging bottom surface; and wherein the front vertical transverse wall, the rear vertical transverse wall and the cross beam engaging bottom surface form a transverse cross beam receiving channel.

11. A reciprocating floor conveyor slide bearing, as set forth in claim 10, including a left side wall upper finger that engages a first guide beam, a right side wall upper finger that engages a second guide beam, and wherein the left side wall upper finger and the right side wall upper finger limit upward movement of the reciprocating floor conveyor slide bearing relative to the first guide beam and the second guide beam.

12. A reciprocating floor conveyor slide bearing, as set forth in claim 11, wherein the left side wall upper finger and the right side wall upper finger both extend from the base front end to the base rear end.

13. A reciprocating floor conveyor slide bearing, as set forth in claim 10, including a left side wall lower finger with a first floor slat engaging surface a right side wall lower finger with a second floor slat engaging surface.

14. A reciprocating floor conveyor slide bearing, as set forth in claim 13, wherein the left side wall lower finger and the right side wall lower finger limit upward movement of a first floor slat and a second floor slat.

15. A reciprocating floor conveyor slide bearing, as set forth in claim 13 wherein the left side wall lower finger and the right side wall lower finger both extend from the base front end to the base rear end.

16. A reciprocating floor conveyor slide bearing, as set forth in claim 10, including a left side wall lower front extension that extends downward from the horizontal base and from the base front end to the front vertical transverse wall;

a left side wall lower rear extension that extends downward from the horizontal base and from the base rear end to the rear vertical transverse wall;

a right side wall lower front extension that extends downward from the horizontal base and from the base front end to the front vertical transverse wall; and a right side wall lower rear extension that extends downward from the horizontal base and from the base rear end to the rear vertical transverse wall.

17. A reciprocating floor conveyor slide bearing, as set forth in claim 15, wherein the reciprocating floor conveyor slide bearing is a one piece molded plastic material.

18. A reciprocating floor conveyor slide bearing, as set forth in claim 16, wherein the reciprocating floor conveyor is molded from ultra high molecular weight material.

19. A reciprocating floor conveyor comprising a plurality of side by side parallel floor slats each of which includes a front end, a rear end, a top section with a generally horizontal top surface, a first side, and a second side;

a first side wall integral with the first side of the top section, extending downward from the top section and extending from the front end to the rear end;

a second side wall integral with the second side of the top section, extending downward from the top section, parallel to and spaced from the first side wall;

a first bottom flange integral with the first side wall, extending laterally inward toward the second side wall, extending from the front end to the rear end, and vertically spaced from the top section;

a second bottom flange integral with the second side wall, extending laterally inward toward the first side wall, extending from the front end to the rear end, and vertically spaced from the top section;

a top section cantilevered portion integral with the top section, extending laterally outward from the second side wall, and extending from the front end to the rear end;

a seal flange integral with the first side wall including a seal support with a seal support surface, a vertical wall integral with the seal support flange that cooperates with an outboard side of the first side wall to form a seal retainer channel that is outboard of the outboard side of the first side wall, has an open channel top and extends from the front end to the rear end;

wherein the top section cantilevered portion of each floor slat is vertically spaced above an adjacent floor slat seal retainer channel; and including a plurality of slide bearings each of which has a transverse channel that receives a cross beam, a fore and aft channel with a base that sits on the cross beam between a pair of adjacent guide beams, a right vertical wall and a left vertical wall extending upward from the base, a left wing that extends laterally outward from the left vertical wall and sits on a first guide beam, a right wing that extends laterally outward from the right vertical wall and sits on a second guide beam, and wherein each of the plurality of side by side parallel floor slats receives the right wing of one of the plurality of slide bearings and the left wing of an adjacent one of the plurality of slide bearings between the first side wall and the second side wall of one of the plurality of side by side parallel floor slats.

* * * * *